United States Patent
Blanding

(10) Patent No.: US 6,229,086 B1
(45) Date of Patent: May 8, 2001

(54) ADAPTER FOR MOUNTING MULTIPLE CIRCUITS TO UTILITY POLES WITH A PAIR OF CROSS-ARMS USING CANDLESTICK HOLDERS

(76) Inventor: Douglas Blanding, 1016 Smithridge Rd., Bridgeport, NY (US) 13030

( * ) Notice: Subject to any disclaimer, the term of this patent is extended or adjusted under 35 U.S.C. 154(b) by 0 days.

(21) Appl. No.: 09/267,405

(22) Filed: Mar. 12, 1999

(51) Int. Cl.[7] ................................................. H02G 7/20
(52) U.S. Cl. ............................................................ 174/43
(58) Field of Search ................................... 174/40 R, 43, 174/44, 45 R, 148, 149 R, 158 R, 161 R, 162, 163 R, 165, 166 R, 168, 169; 52/736.2; 248/49

(56) References Cited

U.S. PATENT DOCUMENTS

| | | | |
|---|---|---|---|
| 804,365 | * 11/1905 | Appleby | 174/146 |
| 1,175,078 | * 3/1916 | Peirce | 174/169 |
| 1,546,213 | * 7/1925 | Duffy | 174/169 |
| 1,680,573 | 8/1928 | Shickluna | 174/149 R |
| 1,697,317 | 1/1929 | Kyle . | |
| 2,721,362 | * 10/1955 | McCoy et al. | 174/43 |
| 3,204,309 | * 9/1965 | Ricker | 174/40 R |
| 3,267,202 | 8/1966 | Leonard | 174/45 |
| 3,360,686 | * 12/1967 | Kalb | 174/140 R |
| 3,428,283 | * 2/1969 | Dake | 248/214 |
| 3,594,494 | 7/1971 | Sullivan | 174/158 |
| 3,643,009 | 2/1972 | Collister | 174/149 |
| 3,649,740 | 3/1972 | Boyer et al. | 174/43 |
| 3,715,460 | 2/1973 | Elliott | 174/158 |
| 4,025,824 | * 5/1977 | Cheatham | 361/332 |
| 5,128,648 | * 7/1992 | Brandi | 337/169 |
| 5,266,738 | 11/1993 | MacVoy | 174/45 |
| 5,568,909 | 10/1996 | Timko | 248/519 |
| 5,605,017 | * 2/1997 | Fingerson et al. | 52/40 |
| 5,772,158 | * 6/1998 | Blanding | 248/49 |
| 5,801,336 | 9/1998 | Blanding | 174/146 |
| 5,981,879 | * 11/1999 | Blanding | 174/168 |

\* cited by examiner

Primary Examiner—Dean A. Reichard
Assistant Examiner—Adolfo Nino
(74) Attorney, Agent, or Firm—George R. McGuire; Hancock & Estabrook, LLP

(57) ABSTRACT

An adapter for mounting multiple 3-phrase circuits to a utility pole. The adapter includes a base unit having a centrally positioned, female socket member, and three, angularly offset legs extending radially outwardly from the bottom of the socket member. Each of the three legs include bottom surfaces extending in a common plane, so as to permit the base unit to be securely attached to a standard cross-arm assembly by passing fasteners through holes formed through each of the legs. A candlestick holder includes a male socket member which is securely positioned within the base unit's female socket member, and further includes three angularly offset, bored holes for receiving three candle sticks therein. By mounting the base unit to the end of a cross-arm assembly and attaching the candle stick holder to the base unit, a 3-phrase circuit can be assembled in minimal space on a utility pole.

17 Claims, 6 Drawing Sheets

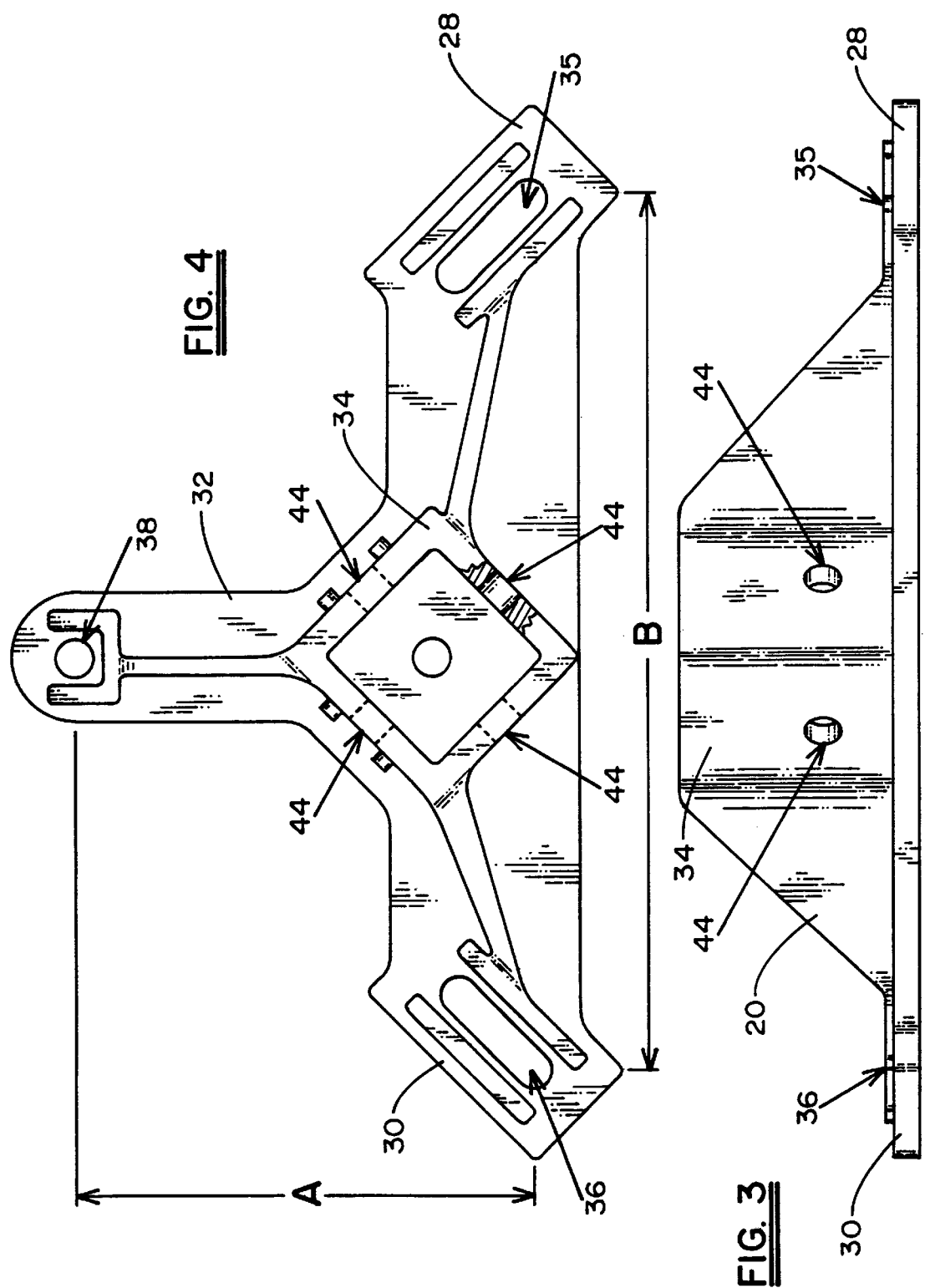

ADAPTER FOR MOUNTING MULTIPLE CIRCUITS TO UTILITY POLES WITH A PAIR OF CROSS-ARMS USING CANDLESTICK HOLDERS

BACKGROUND OF THE INVENTION

The present invention generally relates to apparatus for mounting electrical conductors to utility poles, and more particularly to adapters permitting multiple circuits to be mounted to a single utility pole.

A common overhead electrical distribution system generally operates in one of two ways: either in an arrangement known as a "grounded wye system" or in a "delta system." In both systems, three primary conductors, normally copper or aluminum cables, operate at voltages 120 degrees out of phase with one another (commonly referred to as a "3-phase system"). The voltage travels out from a source (typically a "sub-station") through the primary conductors and then returns to the source. In the grounded wye system, the voltage returns to the source through a neutral (grounded) conductor, while in the delta system, it returns through one of the three primary conductors.

The three conductors are typically mounted to utility poles by either candlestick or cross-arm type construction. In cross-arm type construction, a pair of arms are mounted in transversely extending relation to a utility pole, adjacent the upper end thereof, and in spaced, parallel relation to one another. Three insulating devices are mounted to the pole and cross-arm; one insulator mounted adjacent each end of the cross-arm, and one mounted to the pole, in vertically spaced relation to the cross-arm. Each of the three conductors are mounted to separate insulators, thereby creating a 3-phase system.

Although use of a three phase system is common, and has been for a long period of time, utility companies are beginning to experience increased usage of electricity, thereby creating circuit overload problems in the systems. To accommodate the increased loads on the electrical conductors, the simple solution is to run additional lines from the sub-station. While effective at handling increased loads, this solution is difficult, time consuming and expensive due to the minimum space available on utility poles having cross-arm or candlestick type constructions. In order to maintain the legally required spacing between electrical cables and tele-communication cables, and prevent electrical interference with the multiple circuit mounted on the poles, the original circuit layout on the poles has to be entirely redone, or additional poles need to be run to support the additional circuits.

It is therefore a principal object and advantage of the present invention to provide an adapter that facilitates mounting a plurality of 3-phase circuits to a single utility pole using a combination of candlestick and cross-arm construction.

It is another object and advantage of the present invention to provide an adapter that may be used on cross-arm constructions of mounted to poles of various diameters.

It is a further object and advantage of the present invention to provide an adapter that is easily and inexpensively manufactured.

It is yet an additional object and advantage of the present invention to provide an adapter that is easy to install on existing utility poles.

Other objects and advantages of the present invention will in part be obvious and in part appear hereinafter.

SUMMARY OF THE INVENTION

In accordance with the foregoing objects and advantages, the present invention is an adapter for mounting multiple circuits to a utility pole generally comprising a base unit having three legs extending radially outwardly from a centrally positioned socket. The centrally positioned socket securely receives a candlestick holder having three angularly spaced, bored openings formed therein, each of which threadingly receives a candlestick therein. Alternatively, the candlestick can be fixedly secured within the openings with the use of epoxy, or an equivalent thereof. Thus, the present invention will support up to three candlesticks per base unit.

The three legs extending outwardly from the socket are spaced at predetermined angles from one another. Each includes a planar bottom surface, all of which extend in common plane, thereby permitting the unit to sit flush on a cross-arm assembly. All the legs include holes formed therethrough, with the holes formed through at least two of the legs being elongated so as to permit a bolt to be slidably adjustable therein.

The angular displacement of the three legs is such to permit the adapter to be mounted to a cross-arm assembly having a pair of arms spaced a variable distance apart (e.g., the preferred, standard adapter can be effectively mounted to a pair of cross-arms spaced from between 7 inches to about 11 inches apart, although other size ranges could be manufactured as well). To mount the adapter to a cross-arm assembly, the adapter is rotated until two of the legs sit flush on one of the arms, while the third arm sits flush on the other arm. Bolts are then passed through the holes to securely fasten the adapter to the cross-arms. The candlestick holder may then be secured within the socket, and candlesticks threaded into the bored openings of the holder. By mounting one adapter on each end of the cross-arms and using conventional candlestick construction at the top of the pole, three, 3-phase circuits can be mounted to the utility pole, without impairing the other conductors that may be mounted to the pole.

BRIEF DESCRIPTION OF THE DRAWINGS

The present invention will be more fully understood and appreciated by reading the following Detailed Description in conjunction with the accompanying drawings, in which:

FIG. 3 is a side elevational view of the present invention;

FIG. 4 is a top plan view of the present invention;

DETAILED DESCRIPTION

Figure 1:
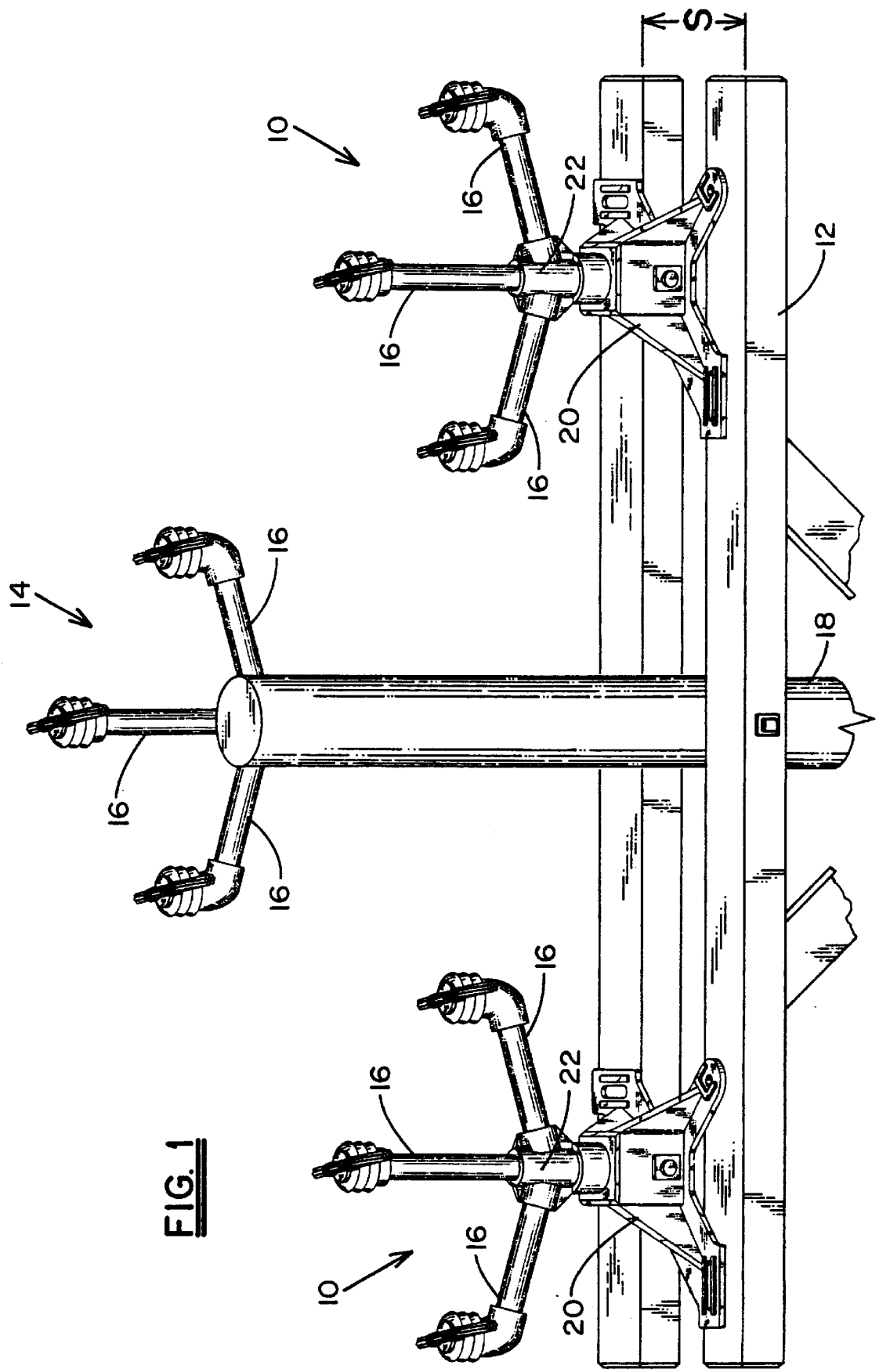
FIG. 1 is a perspective view showing the present invention mounted to a cross-arm assembly.
Figure 2:
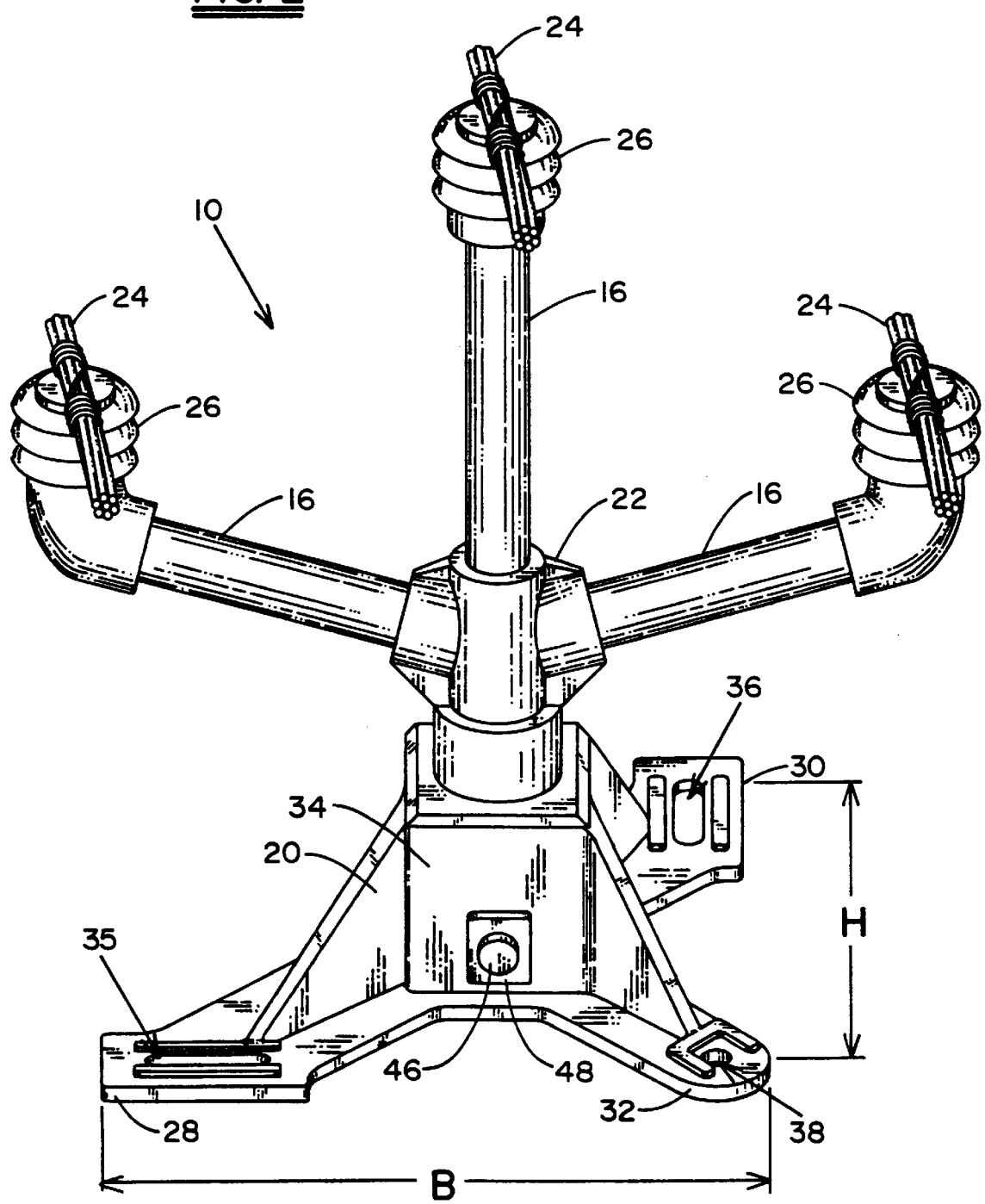
FIG. 2 is a perspective view of the present invention.

Referring now to the drawing, figures, wherein like reference numerals refer to like parts throughout, there is seen in FIG. 1 a pair of 3-phase circuit adapter, denoted generally by reference numeral 10, mounted to a conventional cross-arm assembly 12. A conventional 3-phase circuit, denoted generally by reference numeral 14, constructed from candlesticks 16 is assembled adjacent the upper end of utility pole 18 to which cross-arm assembly 12 is also attached. Accordingly, at least three 3-phase circuits can be mounted to a standard utility pole and cross-arm assembly, it being understood that additional 3-phase circuits could be added depending upon the length and/or number of cross-arm assemblies mounted to a pole.

Adapter 10 is generally comprises a base unit 20 which is adapted to securely receive a candlestick holder 22. Base unit 20 may be fixedly secured to a standard cross-arm assembly 12, while candlestick holder 22 can securely receive up to three candlesticks 16, thereby enabling adapter 10 to carry a 3-phase circuit (e.g., three conductors 24, such as copper or aluminum cable, mounted to insulators 26 carried on the ends of the three candlesticks 16) at one end of cross-arm assembly 12.

Referring to FIGS. 2–5 unit 20 includes three legs 28, 30 and 32 extending radially outwardly from a centrally positioned female socket 34. Legs 28, 30 and 32 are positioned at predetermined angles to one another. Angles of about 180 degrees, 90 degrees and 90 degrees, respectively, constitute the best mode currently known to the inventor, as is illustrated in the figures. In addition, legs 28, 30 and 32 each include a substantially planar bottom surface, all of which lie is a common plane with one another to facilitate effective mounting of adapter 10 to cross-arm assembly 12.

As best illustrated in FIG. 4 holes 35, 36 and 38 are formed through legs 28, 30 and 32, respectively to permit bolts to pass therethrough and fixedly attach base unit 20 to cross-arm assembly 12. At least holes 35 and 36 are elongated to allow sliding adjustment of the bolts therein and effectuate more accurate alignment of the bolts into cross-arm assembly 16. The reason for hole 38 for being round is to permit leg 32 to serve as an effective pivot point about which base unit 20 may be rotated in order to accurately align it on cross-arm assembly 12, as will be further explained hereinafter.

Figure 5:
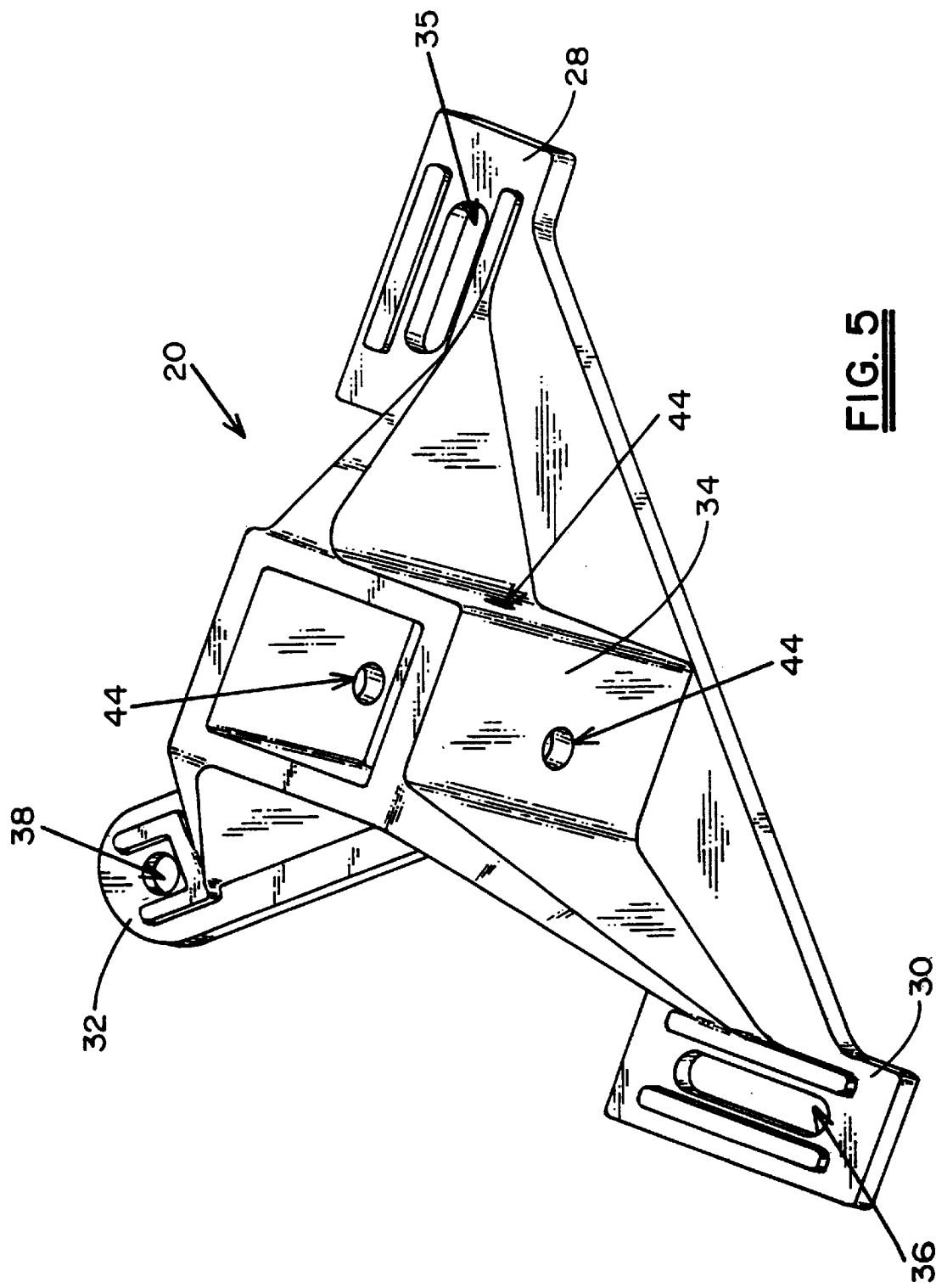
FIG. 5 is a perspective view of the present invention viewed from above.
Figure 6:
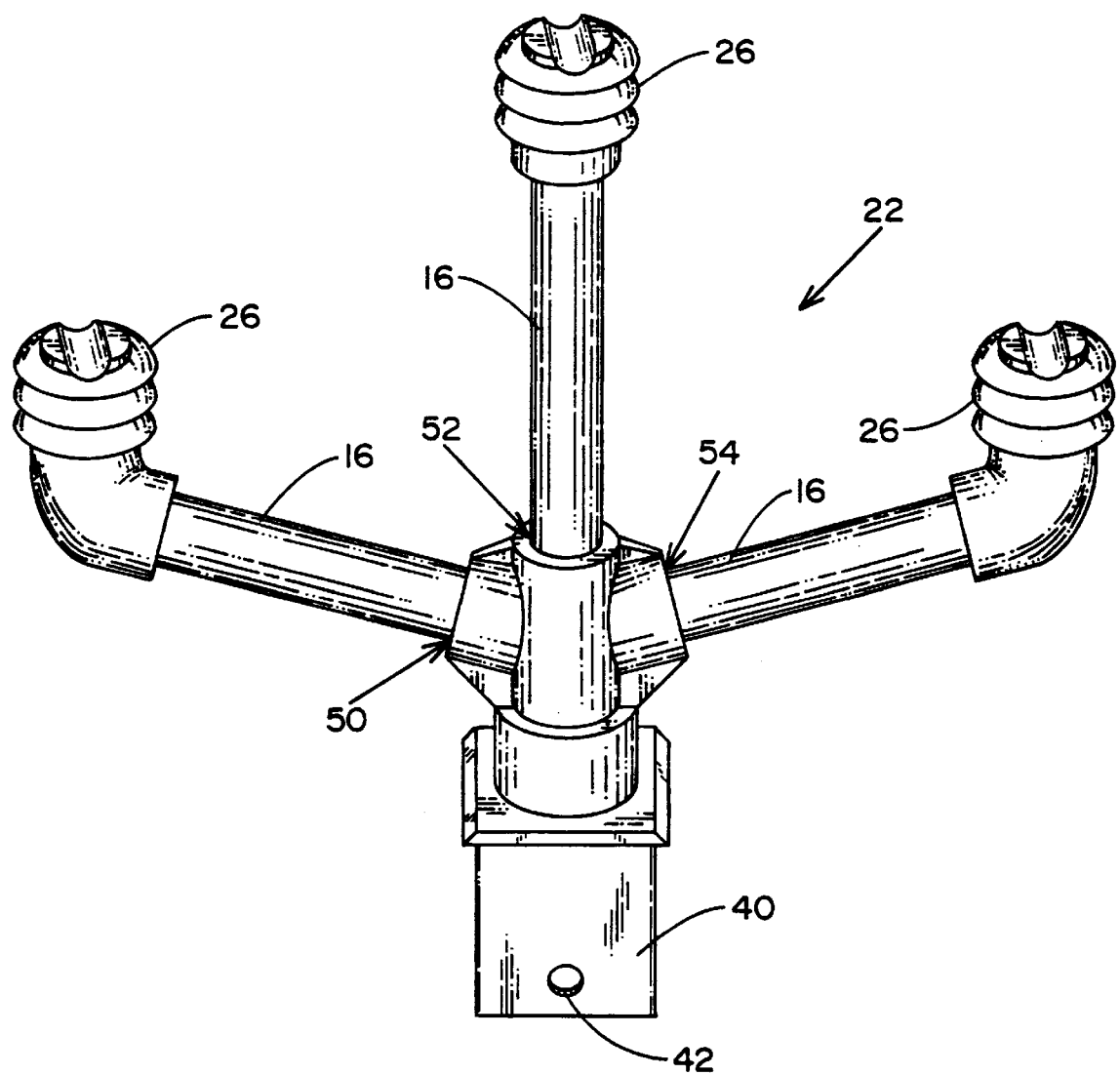
FIG. 6 is a perspective view of a candlestick holder adapted to be mounted to the base unit of the present invention.

Referring to FIGS. 3–5 female socket 34 is of predetermined cross-sectional shape, square for instance and as shown, that is complimentary to the predetermined shape of the male socket member 40 to which candlestick holder 22 is integrally or fixedly attached (see FIG. 6). Male socket member 40 may therefore be inserted within socket 34 with holes 42 and 44, formed through male socket member 40 and socket 34, respectively, axially aligned (both socket members also include diametrically opposed holes formed therethrough, the one on member 40 not being shown in the figures). A bolt 46 may then be inserted through holes 42 and 44, and a nut 48 threaded onto the end of bolt 46 to securely retain candlestick holder 22 to base unit 20.

Referring to FIG. 6 candlestick holder 22 includes three, internally threaded, bored openings 50, 52, and 54, each one of which threadingly receives the proximal end of a standard candlestick 16. The longitudinal axes of openings 50, 52 and 54 extend in a common plane and are angularly offset at predetermined angles with respect to one another, in order to ensure adequate separation of the conductors 24 ultimately attached to insulators 26 mounted on the distal ends of candlesticks 16. As described previously, insulators 26 and candlesticks 16 are conventional and require no modification to work with the present invention.

Referring to FIG. 1 cross-arm assembly 12 is standard insofar as it includes a pair of elongated arms 56 and 58 attached to opposing sides of pole 18 and extending in laterally spaced, parallel relation to one another. The lateral spacing S between arms 56 and 58 varies depending upon the diameter of pole 18 and width of the arms. Due to this variability in the lateral spacing of arms 56 and 58, adapter 10 has been designed to be adjustably and securely positioned thereon, regardless of the lateral spacing. In the present inventions, preferred form, this spacing will range from 7 inches to 11 inches as that has been found to accommodate most, if not all, current cross-arm construction, it being understood that the present invention could be made to accommodate any spacing.

As alluded to previously, base unit 20 may be rotated and oriented such that legs 28 and 32 are mounted to arm 56 while leg 30 is mounted to arm 58 (see FIG. 1) or legs 30 and 32 are mounted to arm 56 while leg 28 is mounted to arm 58 (not illustrated). Regardless of the mounting orientation, base unit 20 is designed such that it can mount to arms separated between distance A (e.g., 7 inches) and distance B (e.g., 11 inches) (see FIG. 2). In the illustrated embodiment, leg 32 serves as the pivot point of base unit 20 with legs 28 and 30 facilitating the orientation such that a secure connection is made between base unit 20 and cross-arm assembly 12. Accordingly, the elongated holes 35 and 36 formed through legs 28 and 30, respectively, permit further variability in the spacing of arms 56 and 58 while not limiting the effectiveness of adapter 10.

Figure 7:
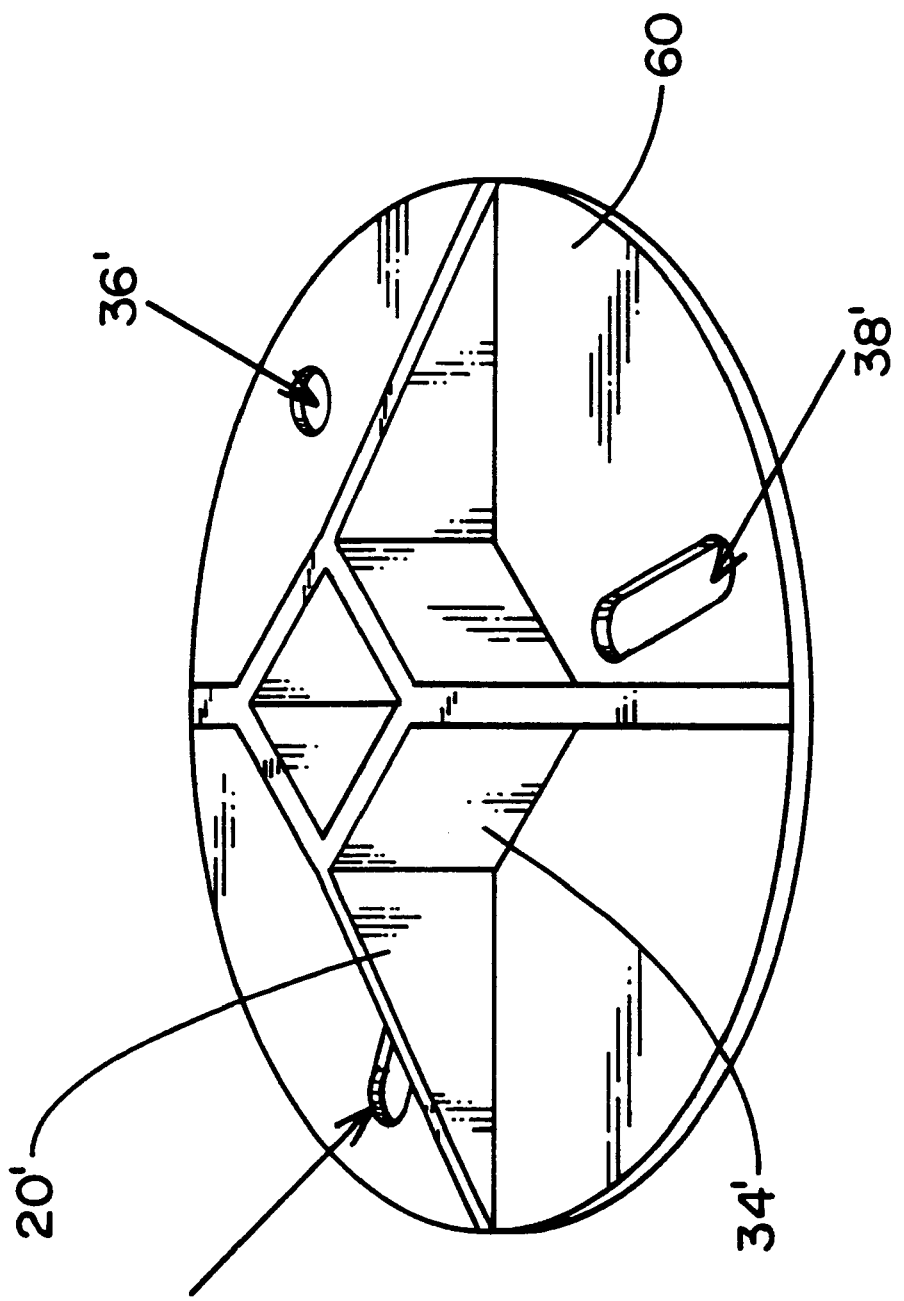
FIG. 7 is a perspective view of an alternate embodiment of a base unit.

Referring to FIG. 7, an alternate embodiment of base unit 20 is shown. Base unit 20' includes a circular base plate 60, as opposed to three legs 28, 30 and 32 of the preferred embodiment. At least two holes 35' and 36' are needed to mount base unit 20's to cross-arm assembly 12, but three holes 35', 36' and 38' are preferred for a more secure attachment. The socket member 34' remains the same as in the preferred embodiment.

What is claimed is:

1. An adapter for use in mounting a 3-phase electrical circuit to a utility pole having first and second conventional cross-arms mounted transversely thereacross, said adapter comprising:
    a) a base unit;
    b) means for mounting said base unit to said first and second cross-arms; and
    c) a candlestick holder attached to said base unit, and adapted to receive first, second, and third candlesticks for securely supporting first, second, and third, electrical conductors.

2. The adapter according to claim 1, wherein said means for mounting said base unit to said first and second cross-arms is at least two mounting holes formed through said base unit for receiving fasteners therethrough to securely attach said base plate to said first and second cross-arms.

3. The adapter according to claim 1, wherein said means for mounting said base unit to said first and second cross-arms is a plurality of legs having respective bottom surfaces extending in a common plane, each of said plurality of legs including at least one hole formed therethrough for receiving a fastener therethrough to securely attach said base plate to said first and second cross-arms.

4. The adapter according to claim 3, wherein said at least one hole formed through at least one of said plurality of legs is circular in shape, and said at least one formed through at least one of the other plurality of legs is elongated in shape.

5. The adapter according to claim 1, wherein said base unit further includes a female socket member of predetermined cross-sectional shape centrally positioned thereon, and said candlesticks holder may be received therein.

6. The adapter according to claim 5, wherein said female socket member is of square, cross-sectional shape.

7. The adapter according to claim 5, wherein said candlestick holder includes a male socket member of the same predetermined, cross-sectional shape as said female socket member and is complimentarily sized to securely fit within said male socket member.

8. The adapter according to claim 7, wherein said male and female socket members each include at least one set of diametrically opposed, axially aligned openings formed therethrough, wherein a fastener may be passed through said openings in order to securely attach said female socket member to said male socket member.

9. The adapter according to claim 1, wherein said candlestick holder includes first, second and third bored openings formed therein each of which is adapted to securely receive one of said candlesticks therein.

10. The adapter according to claim 9, wherein said first, second and third bored openings include first, second and third longitudinal axes, respectively, said first, second and third axes extending in a common plane and at predetermined angles to one another.

11. The adapter according to claim 10, and further comprising first, second and third candlesticks having proximal and distal ends, said proximal ends being securely positioned within said first, second and third bored openings, respectively.

12. The adapter according to claim 11, and further comprising first, second and third insulators securely attached to said distal ends of said first, second and third candlesticks, respectively.

13. An adapter for use in mounting a 3-phase electrical circuit to a utility pole having first and second conventional cross-arms mounted transversely thereacross, said adapter comprising:

a) a base unit having first and second holes formed therethrough for receiving first and second fasteners therethrough, respectively, to securely attach said base unit to said first and second cross-arms; and b) a candlestick holder attached to said base unit and adapted to receive first, second and third candlesticks which support first, second, and third electrical conductors, respectively.

14. The adapter according to claim 13, further comprising a female socket member positioned on said base unit.

15. The adapter according to claim 14, wherein said female socket member is of square, cross-sectional shape.

16. The adapter according to claim 14, wherein said candlestick holder includes a male socket member integral therewith.

17. The adapter according to claim 16, wherein said male socket member is removably mounted within said female socket member.

* * * * *

UNITED STATES PATENT AND TRADEMARK OFFICE
CERTIFICATE OF CORRECTION

PATENT NO. : 6,229,086 B1
DATED : May 8, 2001
INVENTOR(S) : Douglas Blanding

It is certified that error appears in the above-identified patent and that said Letters Patent is hereby corrected as shown below:

Claim 1,
Line 11, after "conductors" insert -- , respectively --.

Claim 5,
Line 4, delete "candlesticks" and substitute therefor -- candlestick --.

Signed and Sealed this

Twenty-eighth Day of August, 2001

*Attest:*

*Attesting Officer*

NICHOLAS P. GODICI
*Acting Director of the United States Patent and Trademark Office*